Figure 11:
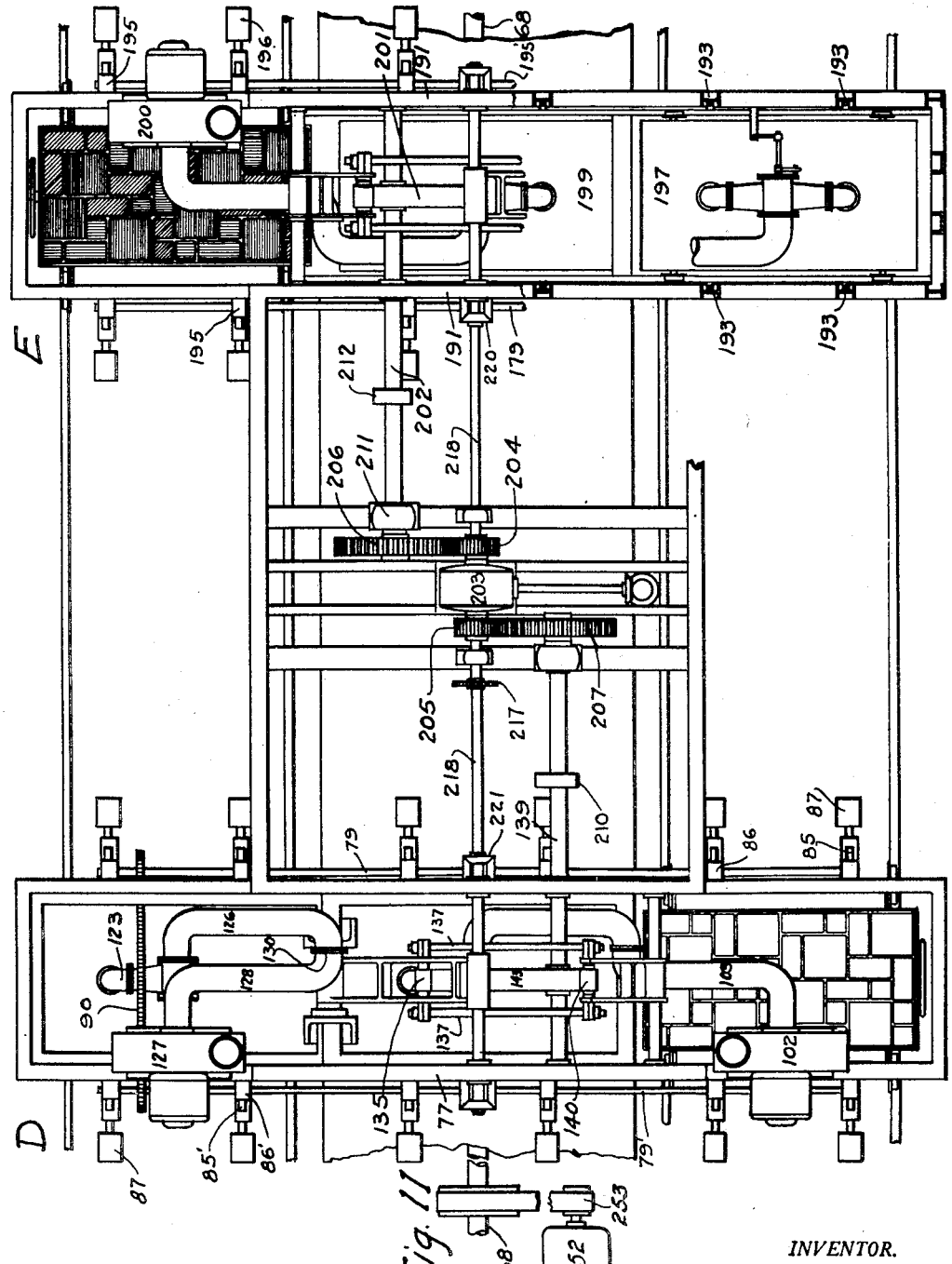

Oct. 31, 1950   T. PESCI   2,527,648
METHOD AND MACHINE FOR MAKING INLAID LINOLEUM
Filed Nov. 8, 1948   12 Sheets-Sheet 1
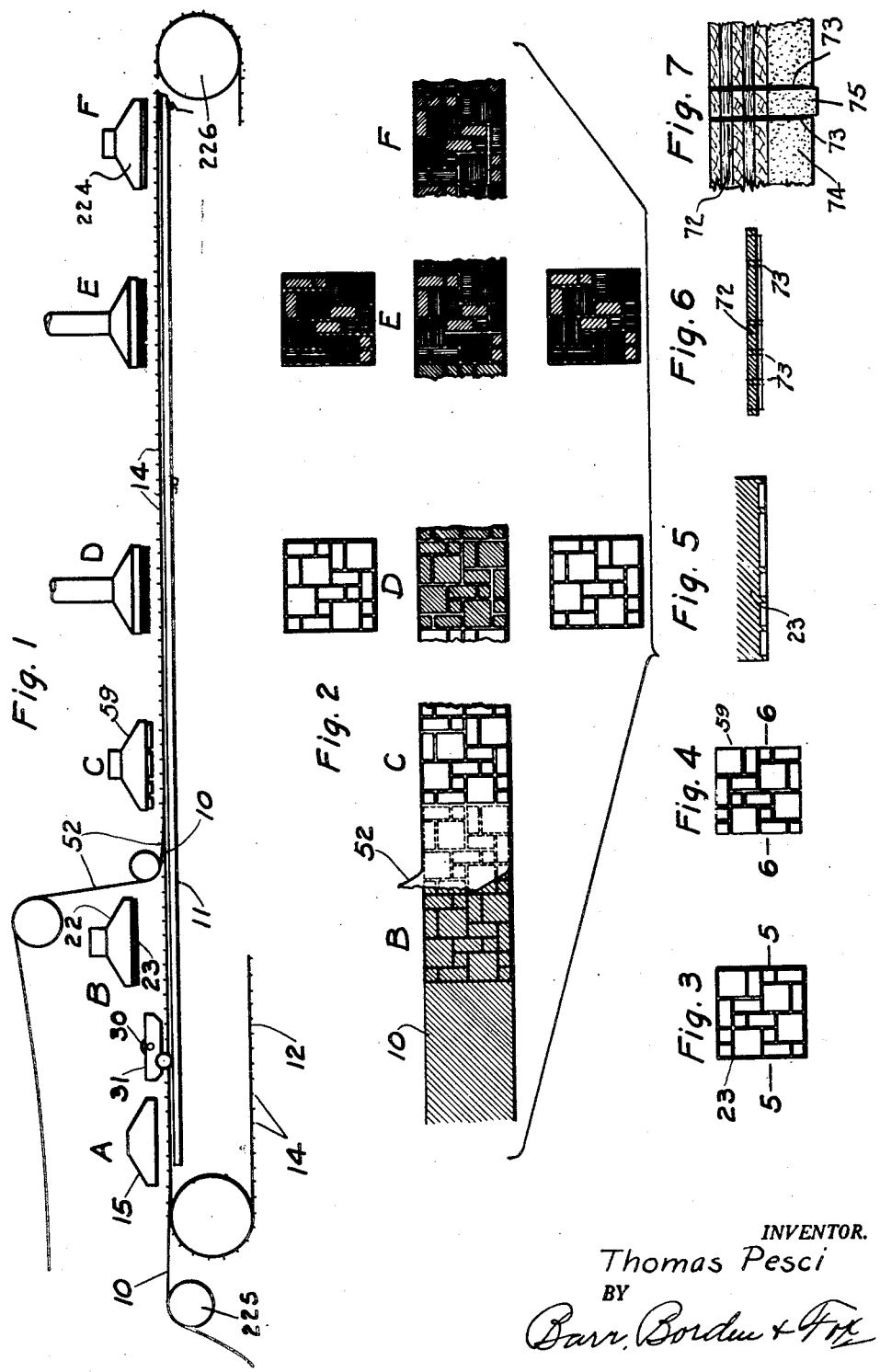

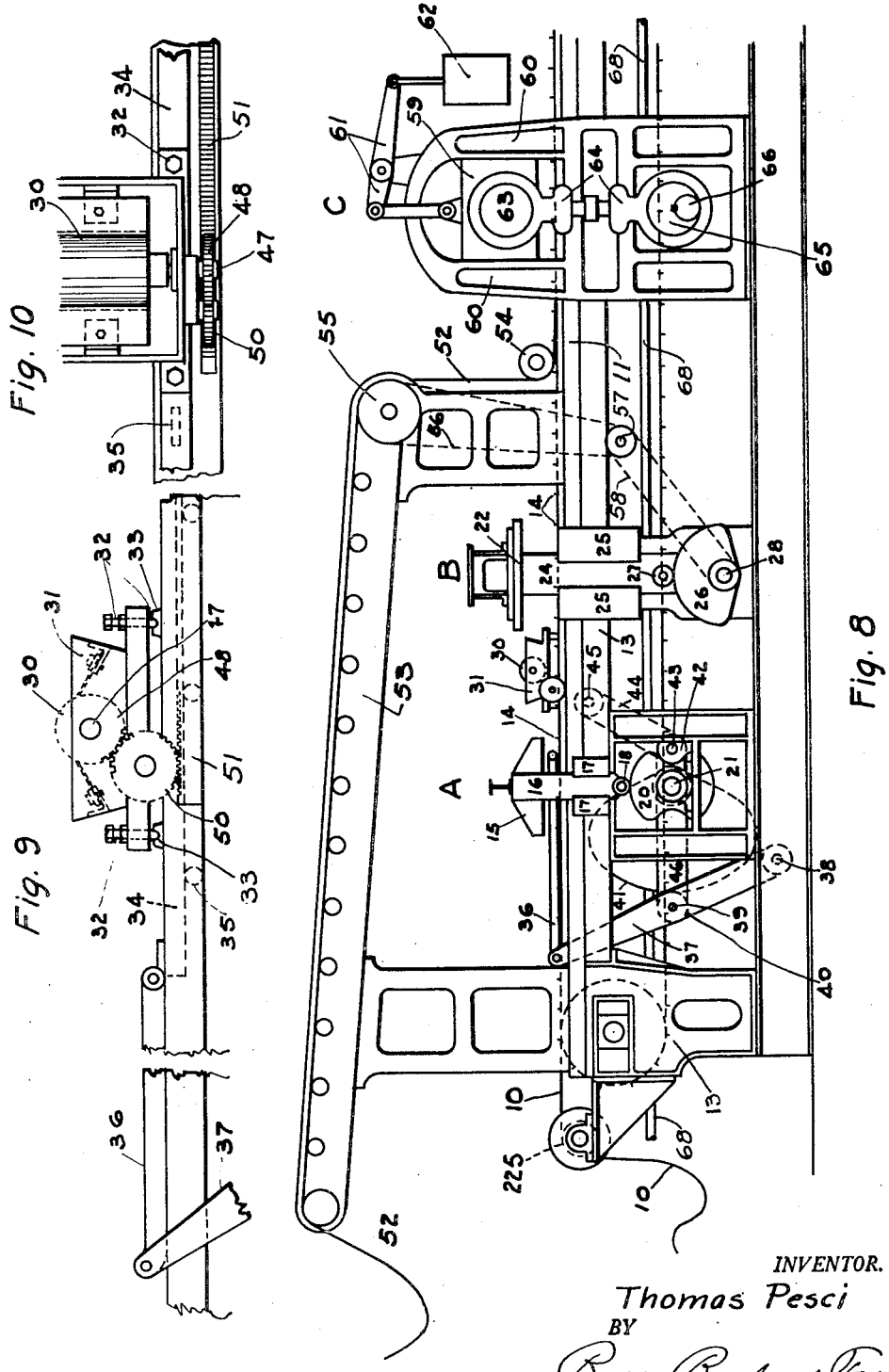

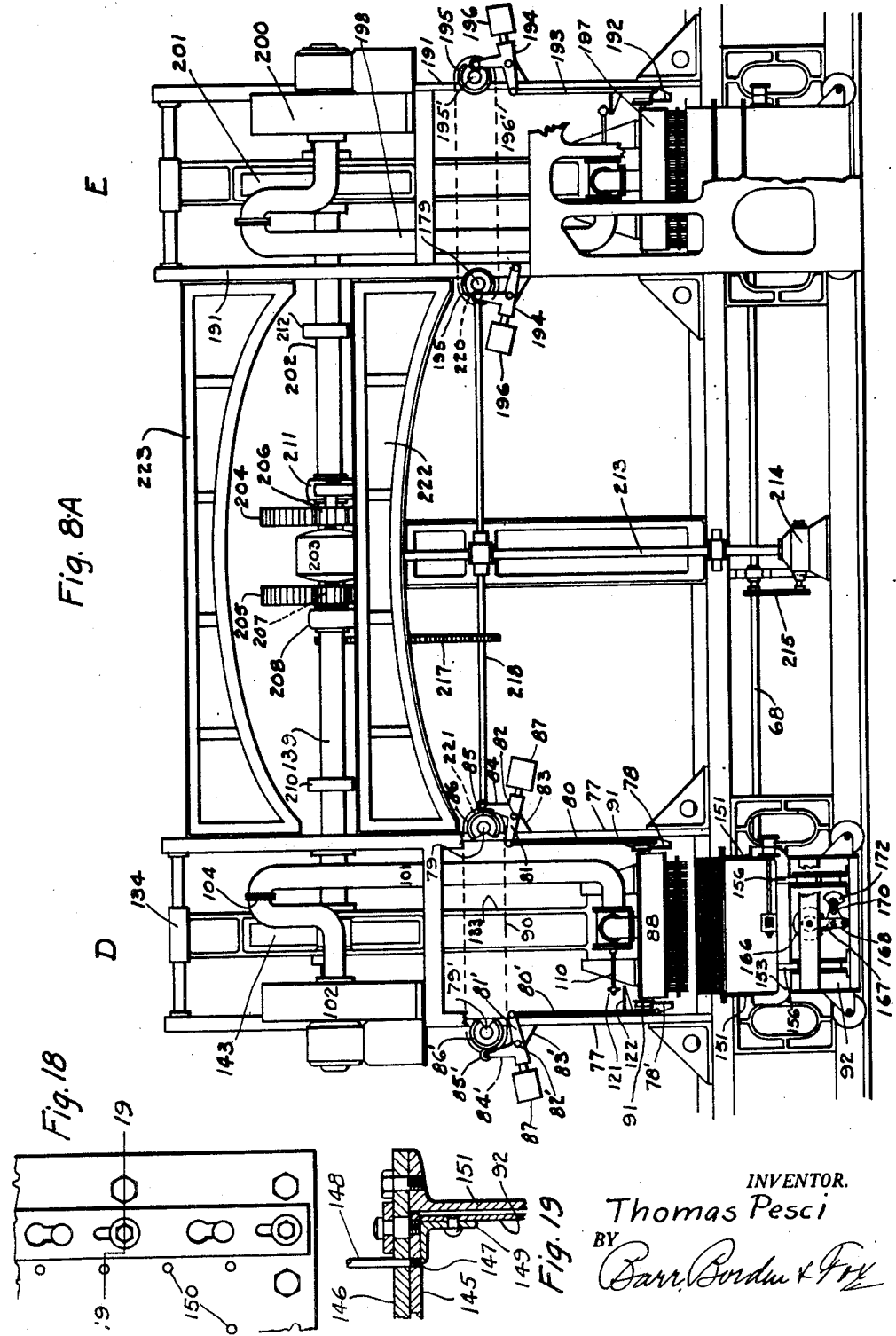

Oct. 31, 1950 T. PESCI 2,527,648
METHOD AND MACHINE FOR MAKING INLAID LINOLEUM
Filed Nov. 8, 1948 12 Sheets-Sheet 4
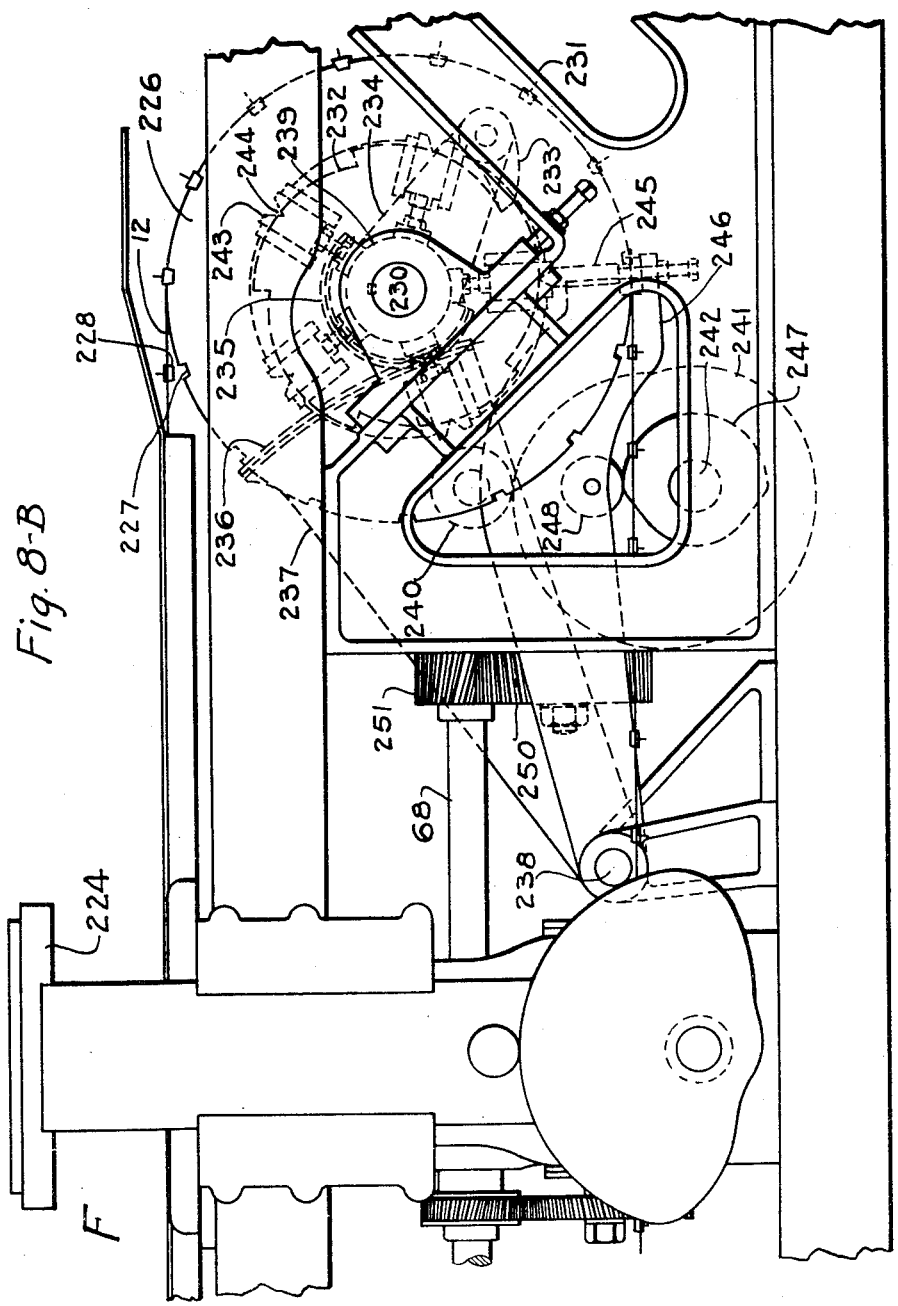
Fig. 8-B
INVENTOR.
Thomas Pesci
BY
Barr, Borden & Fox INVENTOR.
Thomas Pesci Oct. 31, 1950     T. PESCI     2,527,648
METHOD AND MACHINE FOR MAKING INLAID LINOLEUM
Filed Nov. 8, 1948     12 Sheets-Sheet 6

INVENTOR.
Thomas Pesci
BY
Barr, Borden & Fox

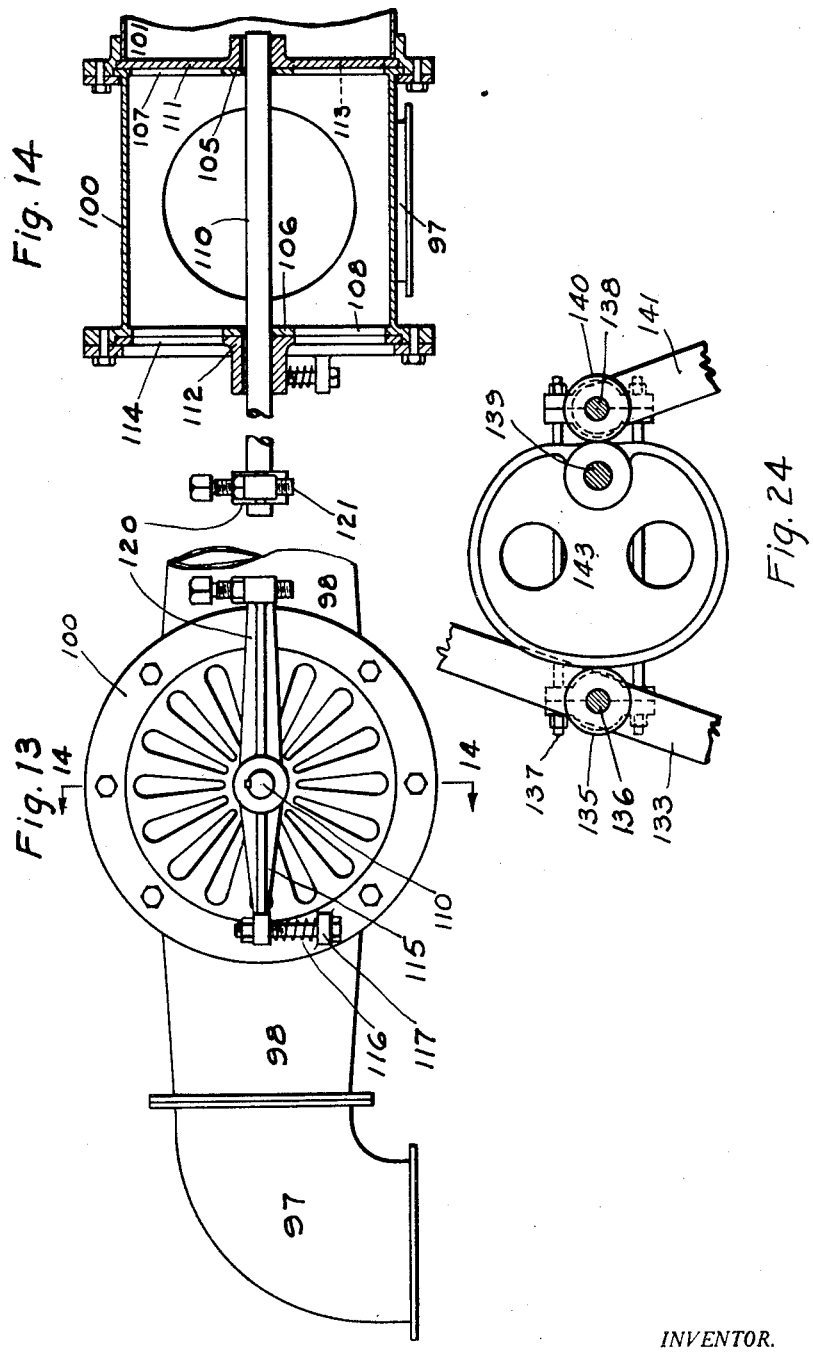

Oct. 31, 1950 T. PESCI 2,527,648
METHOD AND MACHINE FOR MAKING INLAID LINOLEUM
Filed Nov. 8, 1948 12 Sheets-Sheet 8
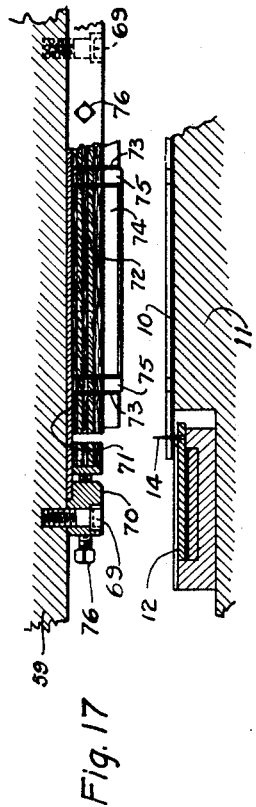
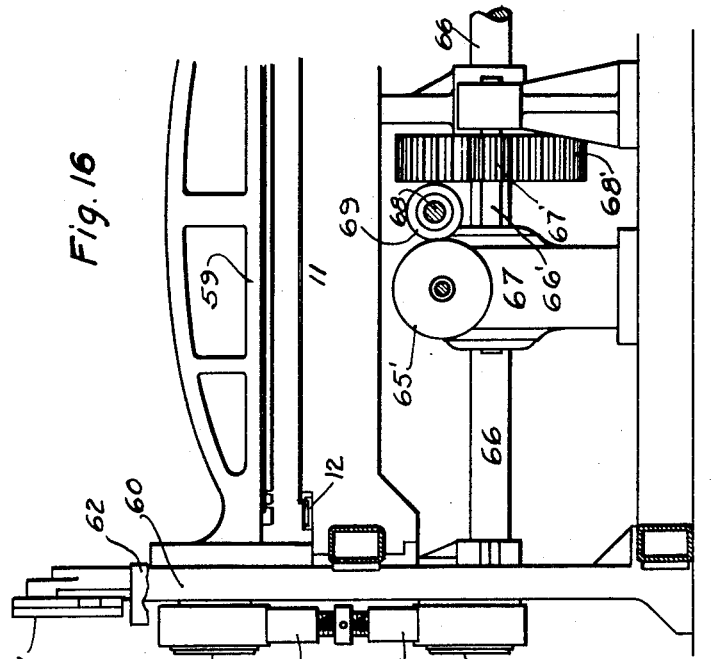
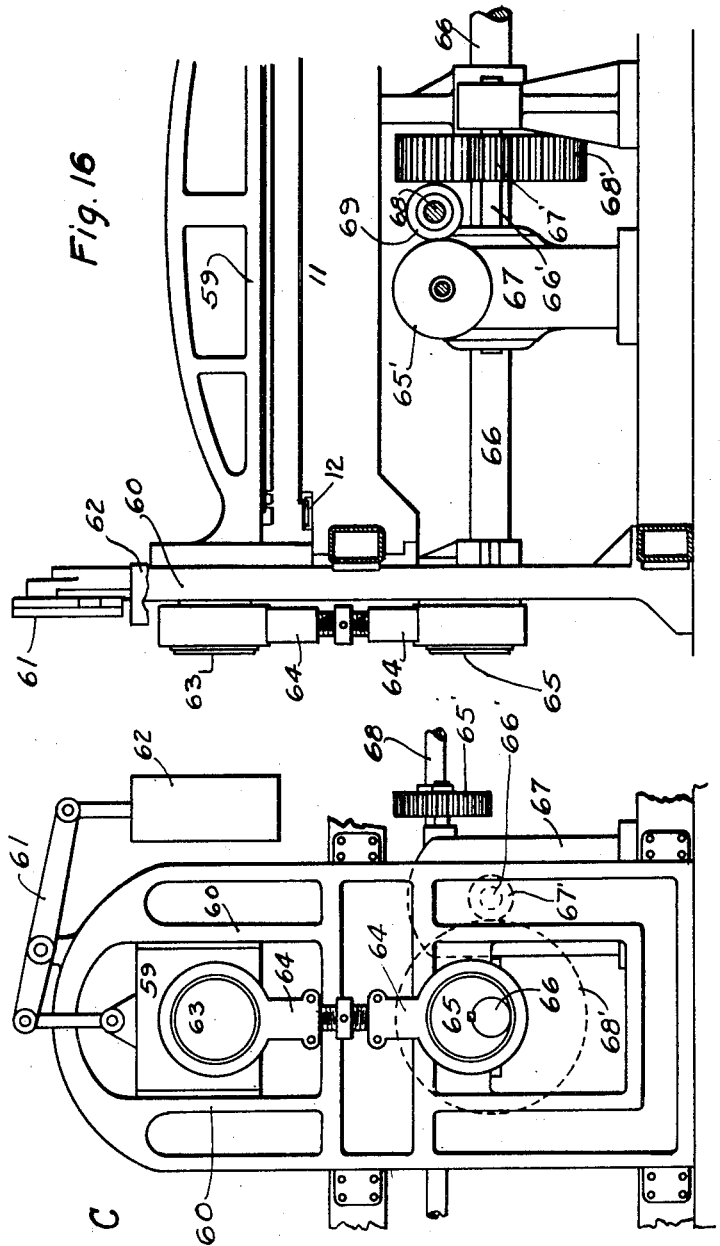
INVENTOR.
Thomas Pesci
BY
Barr, Borden & Fox INVENTOR.
Thomas Pesci.
BY
Barr, Borden & Fox Oct. 31, 1950 T. PESCI 2,527,648
METHOD AND MACHINE FOR MAKING INLAID LINOLEUM
Filed Nov. 8, 1948 12 Sheets-Sheet 10

INVENTOR.
Thomas Pesci
BY
Barr, Borden & Fox

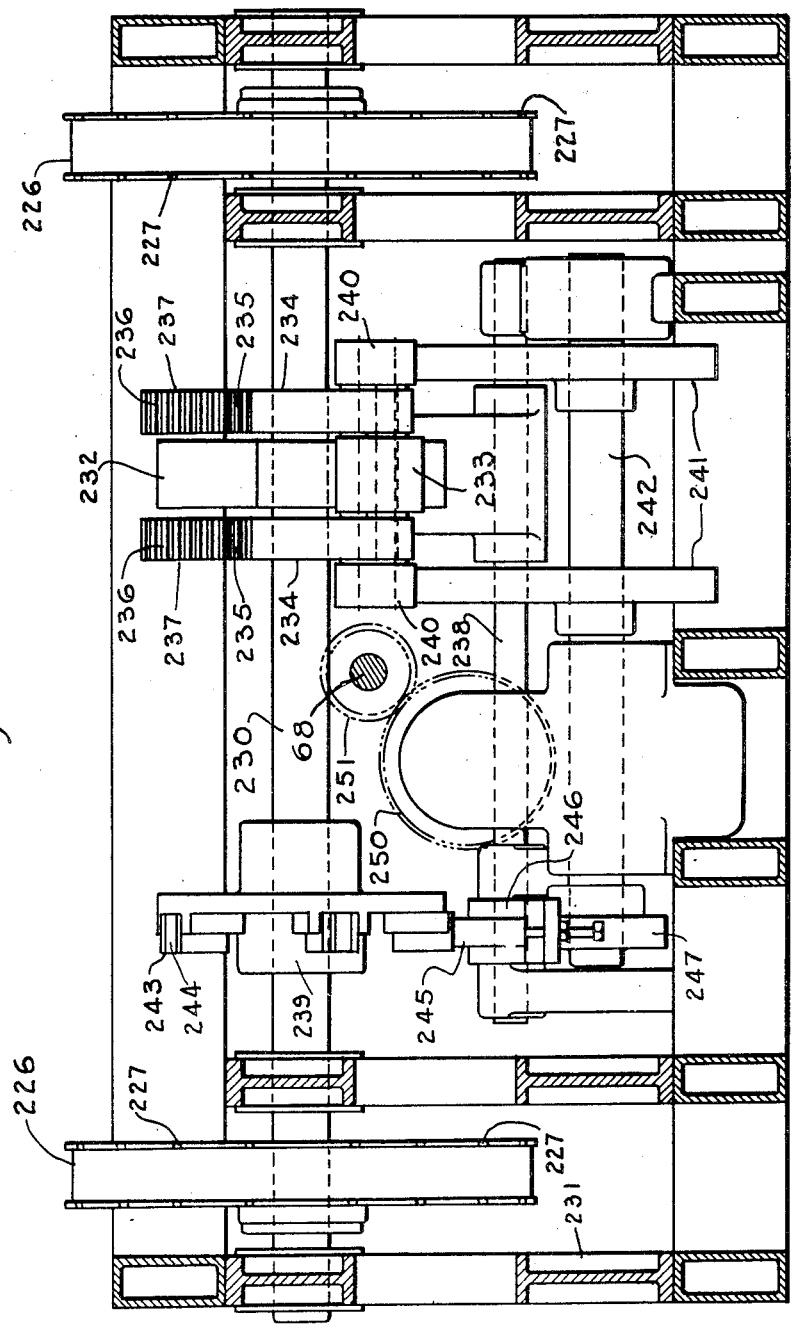

Oct. 31, 1950 T. PESCI 2,527,648
METHOD AND MACHINE FOR MAKING INLAID LINOLEUM
Filed Nov. 8, 1948 12 Sheets-Sheet 12

INVENTOR.
Thomas Pesci
BY
Barr, Borden & Fee

Patented Oct. 31, 1950

2,527,648

UNITED STATES PATENT OFFICE 2,527,648

METHOD AND MACHINE FOR MAKING INLAID LINOLEUM

Thomas Pesci, Philadelphia, Pa., assignor to Bonafide Mills, Inc., New York, N. Y., a corporation of Maine Application November 8, 1948, Serial No. 58,827

22 Claims. (Cl. 154—22)

The present invention relates to fabric manufacturing and more particularly to a method and apparatus for making inlaid linoleum.

Inlaid linoleum as heretofore manufactured is formed from a plurality of individually preshaped plastic components, each generally of uniform color throughout its exposed area, and manually placed according to a selected pattern upon a backing sheet of burlap, felt or other material, and to which each is adhesively secured. Thus, with all components in place, an over-all inlaid pattern is provided in the finished fabric. Components of the type used for linoleum manufacture are relatively thin and non-rigid and therefore are easily mutilated in handling and subject to shape variation, so that proper registration with adjacent, previously placed, components is a tedious and exacting operation even by hand and where attempted by machinery as in the past has materially increased the difficulties of producing an even properly fitted pattern. In so far as automatic handling of components is concerned, it has been proposed to provide stacks of components of like color and shape adjacent a travelling web of felt and then to automatically and successively lift the components from a stack and transfer each to what is supposed to be its proper position on the web to form the pattern. This has militated against the use of any but the simplest of patterns, while the disadvantage of faulty registration between components is still an unsolved problem in so far as machines prior to this invention are concerned.

Some of the objects of the present invention are: to provide an improved method of making inlaid linoleum; to provide an improved machine for making inlaid linoleum; to provide a machine for making inlaid linoleum wherein provision is made for preparing a key pattern and automatically cutting and removing therefrom components which are not to form a part of the final inlaid pattern and then replacing such components with others to form the final inlay pattern; to provide an inlaid linoleum machine wherein certain undesired components are removed from a key pattern and stacked for later use in a pattern of the same design but different color, thereby saving material which otherwise would be wasted; to provide a machine for making inlaid linoleum wherein a key pattern is initially prepared upon a backing web to remain thereon while travelling step by step past component-removing and component-replacing stages; to provide a machine for making inlaid linoleum wherein pattern components can be successfully stacked at the side of the travelling key pattern and can be held by the use of holding pins pressed into the supporting table instead of in the key pattern as heretofore; to provide a machine for making inlaid linoleum wherein pattern components can be stacked for use without danger of multilation; to provide a novel precutting machine wherein a plurality of pattern components of like color can be cut and stacked for future use; to provide a novel step-by-step movement of a backing web operating in synchronized timed relation with continuously moving adjuncts each performing a separate operation effective during each rest period of the backing; to provide a machine for making inlaid linoleum wherein the rate of production of inlaid linoleum is increased materially over machines now and heretofore in use; to provide a novel mounting for cutting blades wherein provision is made for defining predetermined key patterns; and to provide other objects as will become apparent as the description proceeds.

Figure 12:
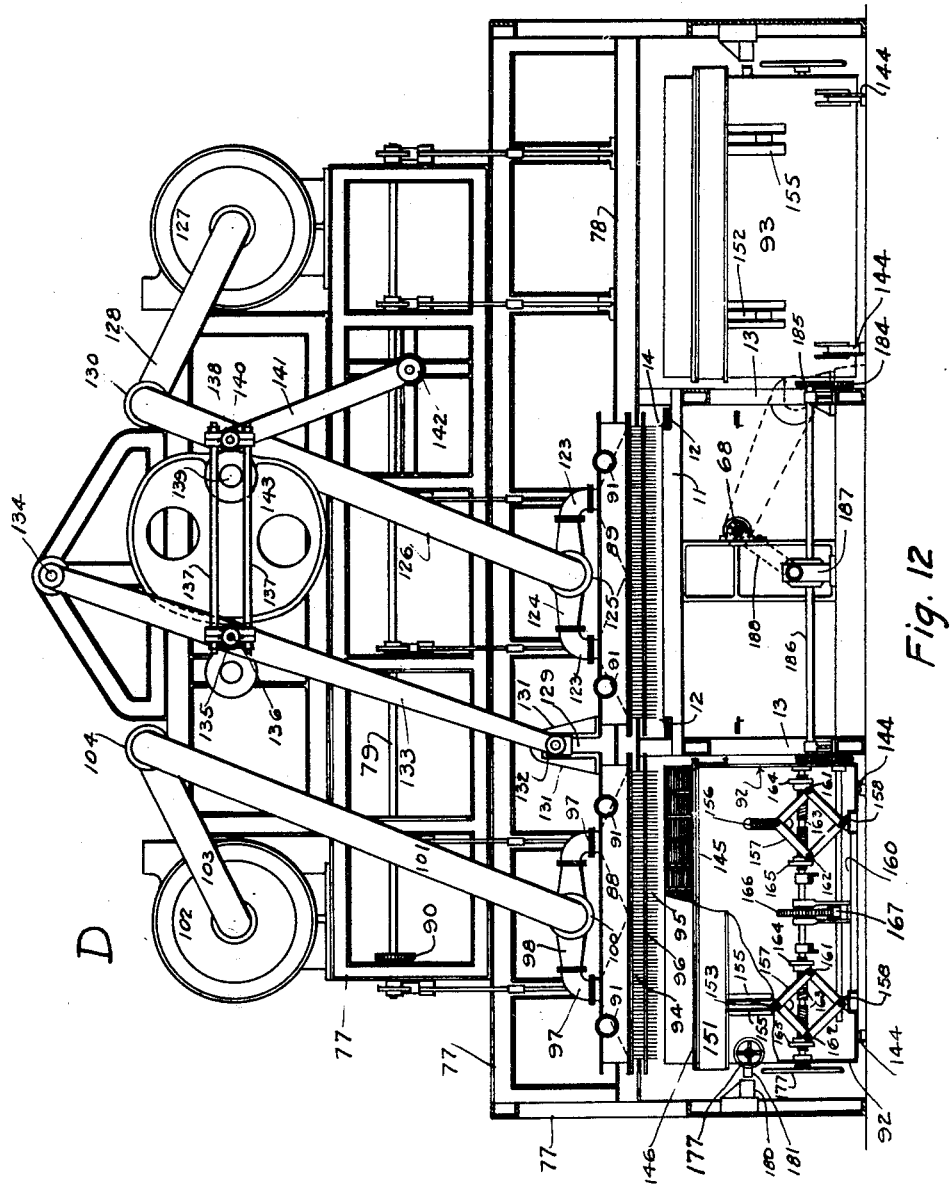
Figure 21:
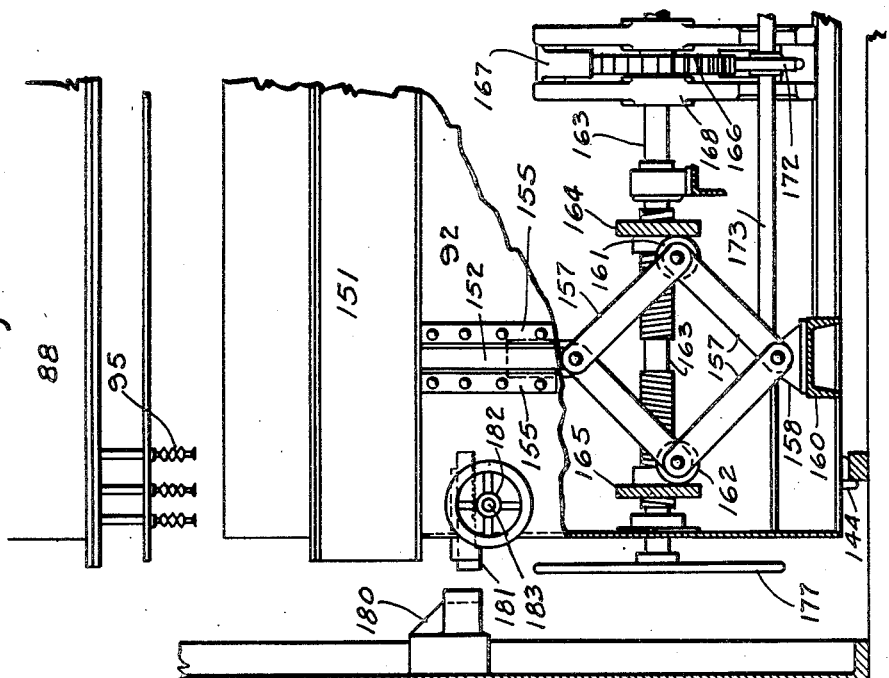
Figure 20:
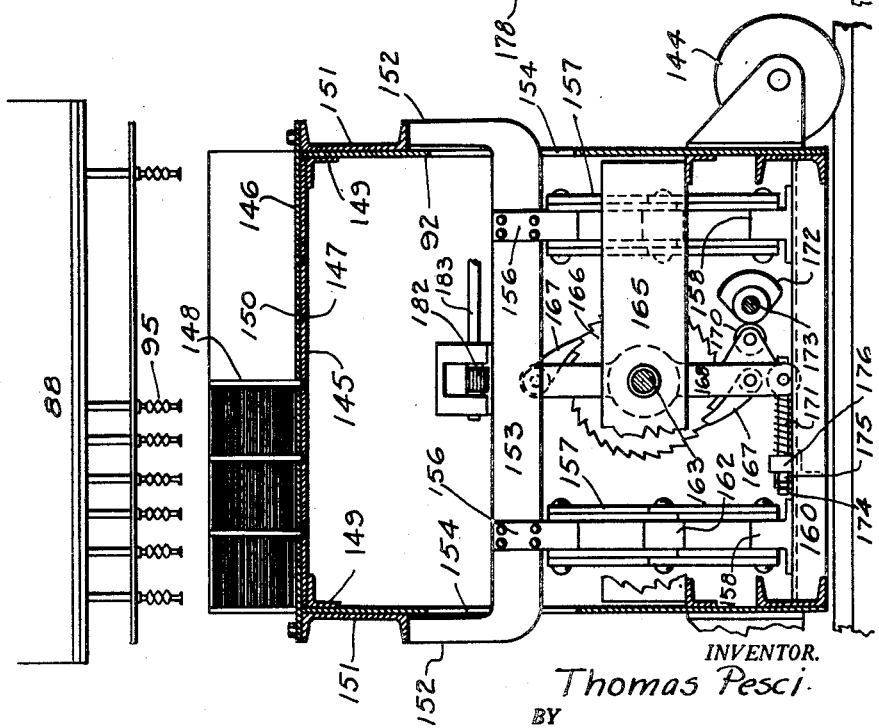
Figure 23:
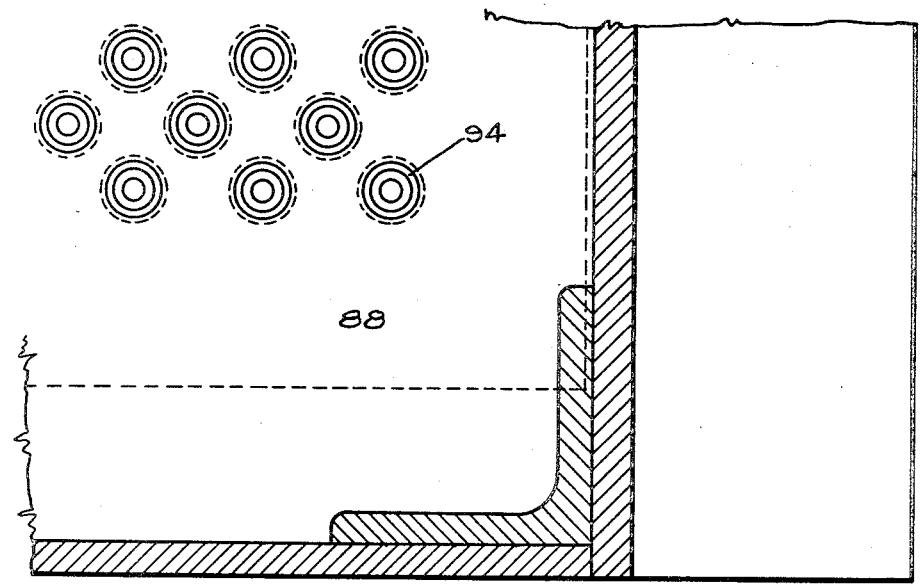
Figure 22:
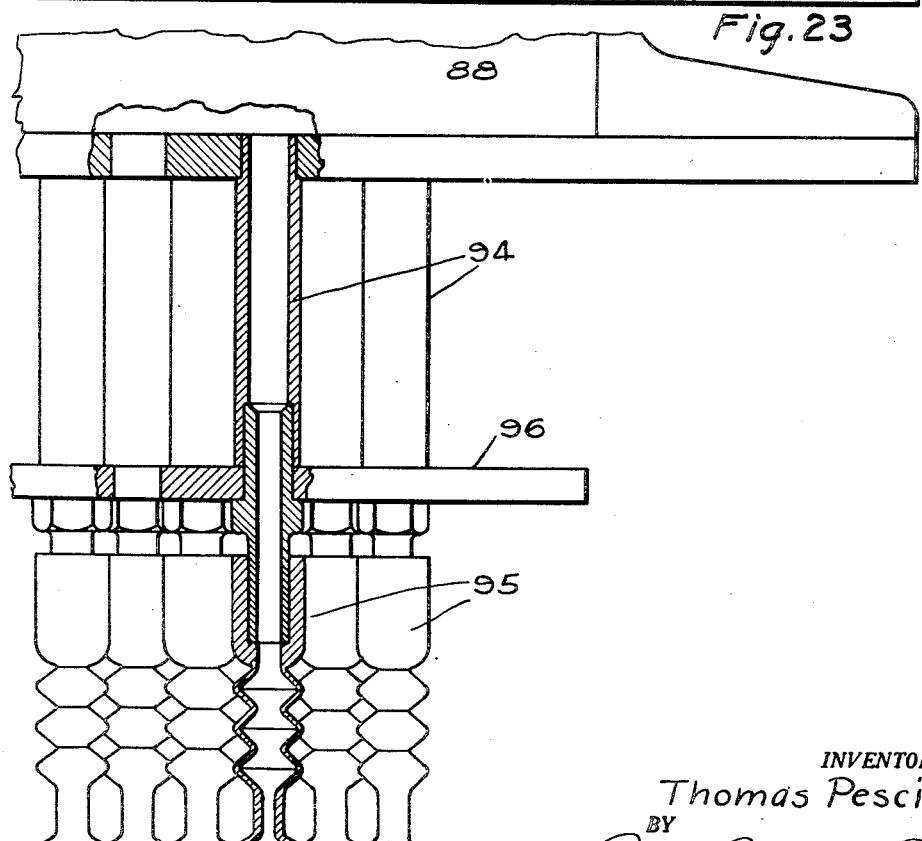
Figure 26:
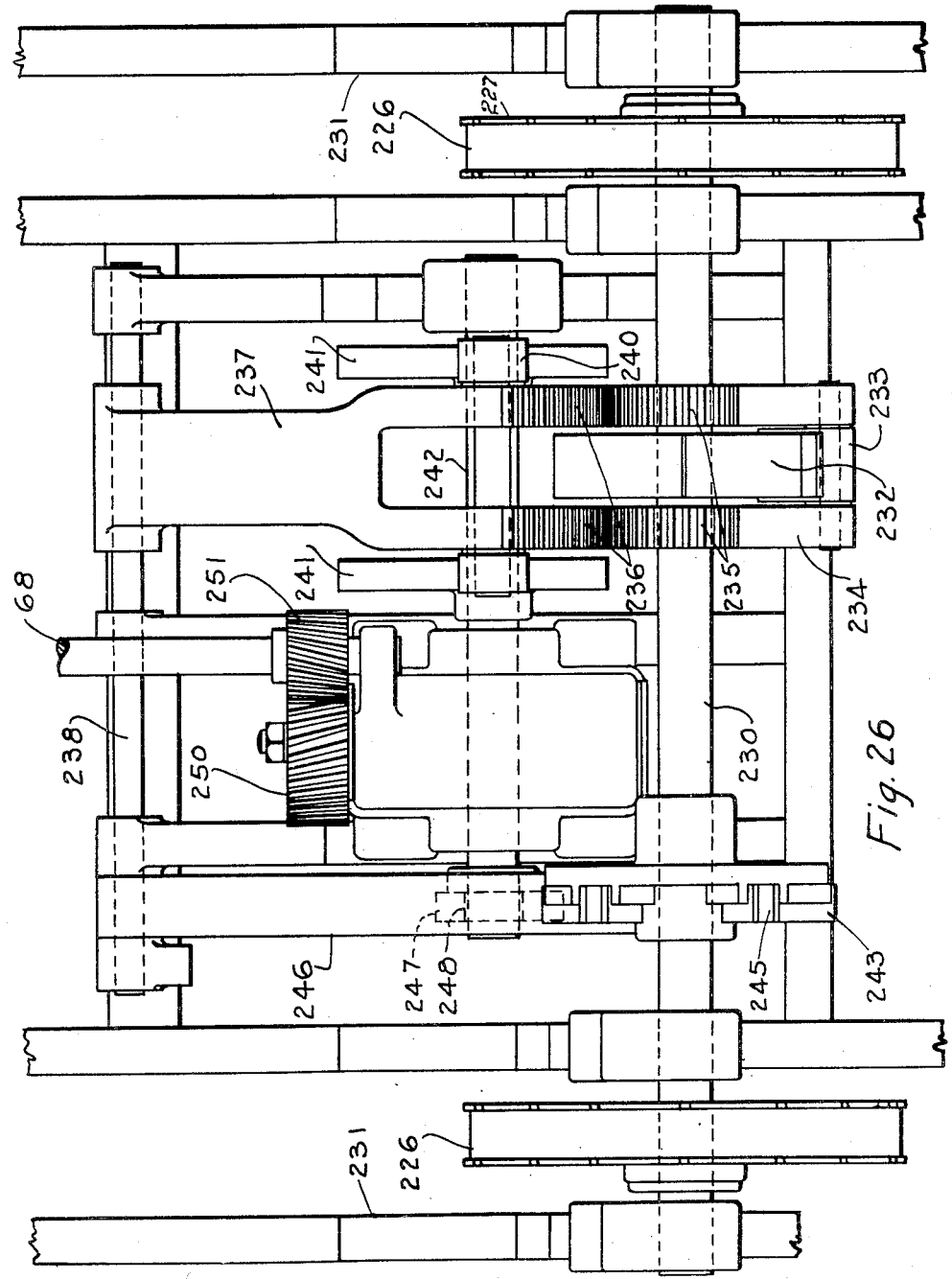

In the accompanying drawings, Fig. 1 represents diagrammatically the several stage operations of the machine; Fig. 2 represents a plan of the backing web and linoleum mix thereon as it appears after the operations at stages B, C, D, E, and F; Fig. 3 represents the working face of the platen for applying glue in the configuration of the selected key pattern; Fig. 4 represents the working face of the pressing and cutting platen; Fig. 5 represents a section on line 5—5 of Fig. 3; Fig. 6 represents a section on line 6—6 of Fig. 4; Fig. 7 represents a detail on an enlarged scale of any of the mounted cutting blades; Fig. 8 represents a side elevation of stages A, B, and C of a linoleum-making machine embodying one form of the present invention; Fig. 8–A represents a side elevation of the machine as a continuation of Fig. 8 and showing stages D and E; Fig. 8–B represents a side elevation of the machine as a continuation of Fig. 8–A showing final stages; Fig. 9 represents a detail on a larger scale of the blue receptacle operating means; Fig. 10 represents a fragmentary plan of the glue receptacle operating means; Fig. 11 represents a plan of the transfer assemblies of stages D and E; Fig. 12 represents a side elevation of the transfer assembly of stage D but can also be the assembly for stage E, except in the latter the operating cam is one hundred and eighty degrees out of phase with the same cam of stage D; Fig. 13 represents a detail in end elevation of the air valve control mechanism; Fig. 14 represents a section on line 14—14 of Fig. 13; Fig. 15 represents an end elevation of the pressing and cutting unit of stage C; Fig. 16 represents a fragmentary side elevation of the unit of stage C; Fig. 17 represents a sectional longitudinal detail of the blade mounting for the unit of Fig. 15 and the related machine bed, web and conveyor part; Fig. 18 represents a partial plan of one form of platform locking means; Fig. 19 represents a section on line 19—19 of Fig. 18; Fig. 20 represents a sectional side elevation of one of the component trucks, shown on a larger scale; Fig. 21 represents a fragmentary end elevation, partly broken away, of the truck of Fig. 20; Fig. 22 represents a fragmentary detail in elevation partly broken away, of the suction nozzle assembly on an enlarged scale; Fig. 23 represents a fragmentary bottom plan of Fig. 22; Fig. 24 represents a detail on a larger scale of the yoke and cam roller construction; Fig. 25 represents a detail in side elevation of the step-by-step mechanism; and Fig. 26 represents a plan of the parts shown in Fig. 25.

Referring to the drawings, the operation of the apparatus and steps of the method are diagrammatically illustrated in Figs. 1 and 2 as introductory to the detailed description, and wherein a backing web 10 of burlap, felt, or other suitable material is indicated as travelling step by step through a succession of operating stages. Thus, at stage A the web 10 is pressed into contact with piercing pins upstanding from two conveyors for feeding the web step by step towards the succeeding stages. At stage B a printing block, having a face shaped in accordance with a selected key pattern, is wiped with glue and then pressed to the web to leave a glue faced pattern. At stage C the sheet of linoleum mix of selected color is fed above the web and pressed into contact with the key pattern outlined in glue on the web backing, while simultaneously cutter blades sever the mix in the shape of the components which are to be removed when the key pattern reaches stage D. Thus, while the key pattern is now an integral part of the web, the components bounded by it are unattached to the web ready for removal. At stage D the preshaped severed components are removed and stacked at one side of the machine for use in other patterns instead of being discarded as waste. Leaving stage D, the key pattern consists of the original key pattern with voids, where the unwanted components have been removed, and such components are now replaced at stage E by the proper components to complete the final pattern of the inlay which has been selected. From stage E the complete inlaid web is delivered to stage F whereby the pattern is pressed into contact with the backing by a heated or cold pressing platen, making ready for the rotary press, at which complete adhesion is secured.

Referring to Figs. 1 and 8 of the drawings, the web 10 is shown entering the machine to seat on a bed 11 with its side margins respectively above two endless conveyors 12, which run the full length of the machine at each side of the bed 11, and are supported by the machine side frames 13. The upper face of each conveyor is provided with a longitudinally disposed row of suitably spaced pins 14 for piercing the web to transmit the desired motion thereto. The entering end of the web 10 passes under two transversely connected pressing weights 15, one above each row of pins 14, so that as the weights are released to drop by gravity, the web margin below each weight will be impaled upon the motion-transmitting pins 14 of the respective conveyors. As shown, the weights 15 are respectively actuated by vertically disposed plates 16 sliding in guides 17 upon the machine frame and projecting downwardly through such guides to terminate respectively in cam rollers 18. The two rollers 18 ride respectively on side face cams 20 keyed to a shaft 21 transversely disposed between the machine sides, while the contour of the cams 20 is preferably such as to lift and release the weights twice during one revolution of the shaft 21. Thus, when the web 10 stops beneath the weights 15, the cam rollers 18 drop into the cam dwell depressions so that the weights descend to cause the web to be pierced by the conveyor pins 14. With this accomplished, the next step movement of the web brings it to stage B where it comes to rest momentarily under the vertically reciprocable horizontally disposed block 22.

In order to apply glue to the face of the web according to a prearranged key pattern, the lower face of the block or platen 22 is provided with a cameo pattern 23 of the selected key configuration arranged to be coated with glue, cement, such as linseed oil solution so that when lowered into contact with the upper face of the web it will deposit the glue upon the web in the form of the selected key pattern. The timed movement of the block or platen 22 is obtained by mounting the platen at opposite sides respectively upon slides 24 which ride in vertical guides 25 under the action of lift cams 26 riding under rollers 27 fixed to the respective slides 24 to give the desired platen stroke. The cams 26 are fast to a driven shaft 28 which receives its motion in precise timed relation to the step-by-step motion of the web, as will hereinafter be described.

For the purpose of applying glue to the cameo pattern, a spreader roller 30 is provided, the same being rotatably mounted transversely of a glue receptacle 31 in such manner that a portion of the periphery of the roller projects, while the remaining portion travels through and collects glue to be transferred to the cameo pattern as the receptacle 31 travels across its face. This movement takes place by supporting the receptacle 31 on four vertically adjustable feet 32 which seat respectively in four cups 33, of which each side pair are fixed to a separate slide bar 34 riding respectively in side rails of the machine frame, but supported on rollers 35 journalled upon the frame side rails for free sliding action. The vertical adjustment for the feet 32 provides means for bringing the spreader roller 30 into wiping relation with the key pattern upon the juxtaposed face of the platen 22. The two slide bars 34 are respectively joined to connecting rods 36 which in turn are interconnected to two rock levers 37 pivoted at 38 to the machine frame and arranged to be reciprocated in unison by a tie rod 39 between them and journalling a cam roller 40 at the center thereof for contact with one face of a cam 41 which is keyed to the shaft 21. A second cam roller 42 is located at the opposite face of the cam 41 and is journalled upon a transverse tie rod 43 which interconnects two swing arms 44 pivoted at 45 to the respective sides 13 of the machine frame. The two tie rods 39 and 43 are connected together by two spaced apart yokes 46, the arrangement being such that the rotation of the cam 41 causes the required reciprocation of the connecting rods 36 and therefore moves the glue roller 30 across the face of the platen 22, to stop in position for the next cycle when it returns for the next wiping contact.

For ensuring that the roller 30 is supplied with glue, the projecting ends of its shaft 47 respectively mounts gears 48 in mesh respectively with gears 50 journalled exteriorly of the receptacle sides and riding respectively in racks 51 fixed to the machine frame. Thus, as the receptacle reciprocates for its wiping action, the gears 50 are rotated to transmit turning of the wiping roller 30 through the body of glue.

The web 10 leaves the stage B with its upper face now coated with glue in the shape of the key pattern impressed by the action of the platen 22 and rides under and in face contact with the incoming layer 52 of linoleum mix, which rides across an overhead frame 53, and down under a guide roller 54 to meet the step by step advancing web 10. The roller 54 also causes the mix to be pierced by the pins 14 of the conveyors. As shown, this feeding of the mix layer takes place through a roller 55 driven by sprocket and chain 56 from shaft 57, which also transmits motion by chain 58 to the shaft 28. The web 10 with its superposed mix layer 52 is now delivered to stage C.

The function of stage C is to press and smoothly secure the linoleum mix layer 52 against the glue-outlined key pattern upon the web 10 to be held also by the conveyor pins 14, while simultaneously severing, from that key pattern, those portions of the mix layer 52 which are not to be a part of the predesigned final inlay pattern. When these severed portions are removed at stage D, voids will be left which are to be filled in with complementally shaped inlay components to complete the final inlaid pattern as will be presently described. The pressing and severing unit at stage C comprises a vertically reciprocable head 59 slidable in side guides 60 and provided at opposite ends respectively with suitable pivoted linkage 61 carrying counterweights 62. The ends of the head 59 project at opposite sides of the machine in the form of relatively heavy pins 63, each fitting in the upper end of a driven yoke 64, the lower end of which encircles an eccentric 65 keyed to a shaft 66 driven through a reduction unit 67 from the main drive shaft 68 by means of pinion 69', gear 65', reduction gear shaft 66', pinion 67', and gear 68' keyed to the shaft 66.

In order to perform the pressing and severing operations, the contact face of the head 59 is in the form of an annular box-like frame 70, preferably rectangular, extending in assembled condition transversely of the web to provide an opening within which the pressing and severing unit is mounted. The bounding margin of the opening is horizontally recessed to seat a steel backing plate 71 to which a base 72, preferably of laminated material such as plywood is anchored. The base 72 is laid off in a pattern of cuts so spaced and arranged relatively as to form a replica of the same size as the key pattern upon the web. Each pattern cut frictionally holds a cutting blade 73 which projects from the bottom of the base to pass through a cushioning mat 74 of sponge rubber to terminate substantially in the plane of the bottom face of the mat. The mat 74 is glued to or otherwise fixed to the bottom of the base 72. In each space bounded by the blades 73 is a pressing member 75 of sponge rubber, and this projects about a sixteenth of an inch beyond the aforesaid bottom face of the mat. With the properly prepared unit ready for use, it is dropped into the frame 70, and the latter then bolted to the head by suitable fastening devices, such as stud bolts 69. At suitable locations about the outer wall of the frame, adjusting bolts 76 are threaded through the frame to engage the respective sides of the base as a means of compressing the base to grip the blades 73. When the head 59 is lowered for operation, the pressing member 75, being in the pattern of the key pattern, lowers to superposed relation with the key pattern in glue to press the linoleum mix fast to the glue while the mat seats upon all areas of the mix which are to be removed. With the pressing member in its lowest position, the cutting blades 73 now sever the mix from the boundaries of the key pattern, not, however, lowering beyond the thickness of the mix. All of this operation is precisely timed with the step-by-step movement of the web and the relation of the head to the web is accurately positioned for true vertical alinement of the pressing member with the glue key pattern. Thus, as the web leaves stage C it will have the area or areas to be removed outlined by the lines of severing and, as heretofore pointed out, the severing cuts penetrate only through the mix layer without disturbing the web backing so that these areas or components can be readily removed.

For the purpose of removing these severed components and stacking them at the side of the machine, a fixed rigid frame is disposed transversely of the machine (stage D) and comprises two interconnected skeleton upright side frames 77 which are spaced apart to straddle a predetermined length of pattern area as it passed therethrough or comes to rest therebetween. The length of the frames 77 is greater than three times the width of the web in order to project at opposite sides thereof so that the component pick-up units will alternately assume positions above two stack loading trucks located at opposite sides respectively of the machine. These frames 77 form spaced guides for two horizontally disposed beams 78 and 78' extending the length of the frames at opposite inner sides thereof and which are suspended at suitable intervals from pairs of vertically disposed lift rods 80 and 80' which are pivotally connected at their upper ends respectively to bell cranks 81 and 81' arranged to rock about fixed pivots 82 and 82' carried respectively by brackets 83 and 83' mounted upon the aforesaid frames 77. The arms 84 and 84' of the respective bell cranks terminate in cam rollers 85 and 85' riding in contact respectively with driven cams 86 and 86'. The two rows of cams 86 and 86' are respectively keyed to two horizontally journalled shafts 79 and 79' paralleling opposite outer sides of the frames 77.

In the present instance, the pattern component lifting means comprises two box units 88 and 89, arranged in side to side relation across the web, and each supported by sets of wheels 91 for travel transversely of the pattern web upon the beams 78 and 78'. Each box unit has a bottom face area sufficient to extend entirely over that portion of the pattern which is to be brought into position beneath it. The aforesaid units 88 and 89 are duplicates and in this description like parts will be given like reference numerals to avoid needless repetition. Two such units are provided and together have a combined length at least twice the width of the web so that one box unit 88 will be over a loading truck 92, when the other 89 is over the pattern in one position of unit travel, while travel in the opposite direction reverses the relation of the units to the web and brings unit 89 over a loading truck 93 when the unit 88 is over the pattern. This makes it possible to load two trucks at a time as the units alternately engage successive pattern areas momentarily stopping at stage D.

Both box units 88 and 89 are sealed to hold a vacuum and the bottom of each is provided with staggered perforations respectively communicating with rigid suction tubes 94 terminating respectively in flexible bellows type suction head 95. The tubes 94 are laterally braced by a plate 96 properly perforated to receive the respective tubes 94. Thus, the plate 94 viewed from below appears as a multiplicity of suction nozzles 95, preferably spaced three quarters of an inch apart in staggered rows so that when lowered into contact with the mix on the web every severed component will be under one or more of the suction nozzles ready to be lifted out on the upstroke of a box unit. Also, the volume of each box unit is reduced to an operating minimum as indicated in dotted lines in Fig. 12.

In order to pull a vacuum in the box unit 88, the top thereof is provided with two outlets (Figs. 12 and 13) communicating respectively with two branches 97 of a manifold 98 leading to and communicating with a cylindrical valve chest 100 from which a suction pipe 101 leads to a motor driven exhaust fan chamber 102 by way of an offset pipe 103 and pivot joint 104. This latter 104 allows the pipe 101 to follow the movement of the unit 88 as it rises, lowers, and swings laterally.

For controlling the passage of air through the valve chest 100, the opposite ends thereof are in the form of apertured heads 105 and 106, the apertures being in the form of radially arranged tapered ports 107 and 108, the ports 107, when open communicating with the pipe 101, while the ports 108 when open communicate with the atmosphere. The ports 107 and 108 are alternately opened and closed and for that purpose a rock shaft 110 is carried axially of the chest and has two disc valves 111 and 112 mounted thereon, each externally of the chest head but in close sealing relation. The valve 111 is provided with radially disposed ports 113 of like size, spacing and configuration to the head ports 107, so that in open positions both sets of ports 107 and 113 will be in register for passage of air, but in closed position the ports 113 will be out of register with the ports 107 so that air is cut off. Likewise, the disc valve 112 is provided with radially arranged ports 114 of like size, spacing and configuration as the head ports 108, so that in open positions both sets of ports 108 and 114 will be in register to exhaust air from the chest and system but in closed positions the ports will be out of register. Thus, the valve chest and its associated parts provide for two conditions, either subjecting the system to vacuum or relieving it to the atmosphere.

For actuating the rock shaft 110, its projecting end has an arm 115 keyed thereto and is biased to suction open position of the valve 111 by a compression spring 116 which is compressed between the arm 115 and a fixed lug 117 on the chest head. Thus, as the panel of suction nozzles lowers into contact with the linoleum mix all the severed components become automatically attached to the nozzles ready to be removed from the web and carried to a position over one or the other of the waiting trucks. When in this position, which is for discharging the components from the nozzles, provision is made for causing the chest valve 111 and 114 to reverse positions in order to exhaust the chest and system. The means for doing this comprises an arm 120 keyed to the end of the shaft 110, but extending diametrically opposite to the spring biased arm 115, and carrying a vertically adjustable tappet 121 which in the discharging position of the unit 88 has a position above a fixed stop 122 projecting from the side of the machine. The position of the stop 122 is such that it will be met by the tappet 121 at exactly the time the unit 88 has lowered to drop its carried components upon the platform of the waiting truck.

While the foregoing specifically described the vacuum control for the box unit 88, a duplicate thereof control for the box unit 89 is provided, including outlet branches 123, manifold 124, valve chest 125, suction pipe 126 leading to a motor driven exhaust fan chamber 127 by way of offset pipe 128 and pivot joint 130. Likewise, the valve chest 125 is like valve chest 100 and has the same valve control including exhaust relief tappet, which in this instance engages a stop at the other discharge side of the machine to stack the components upon the second truck 93.

In order to move the two box units 88 and 89 transversely of the machine to assume the two required alternate positions, the meeting ends of the two units are interconnected by two spaced yokes 131 and a cross-head 132, the latter riding vertical in guide slots 129, respectively provided in the yokes 131. The cross-head 132 is suspended by an elongated skeleton frame 133 from a pivot bearing 134 supported at its upper end between the side frames 77. The frame 133 is generally of open rectangular shape, the sides of which straddle a cam roller 135, intermediate its length, which is rotatably carried by a spindle 133 having its ends respectively supported by two rod yokes 137. The opposite ends of these yokes are joined by a second spindle 138 carrying a cam roller 140 in horizontal alinement with the cam roller 135. A rock bar 141 supports the spindle 133 from a pivot 142 on the machine frame and maintains the yokes 137 in horizontal alinement. Motion is transmitted to the box unit carrying frame 133 by a cam 143 interposed between the two cam rollers 135 and 140, and keyed to shaft 139. This cam 143 has a contour which gives the required rest period for the box units 88 and 89 during the pick-up and discharging operations.

For receiving and stacking the removed components as released by the nozzles 95, a truck 92, mounted on wheels 144, is rolled into place with its removable top plate 145 beneath and registered with the box unit 88 to form a support for a transfer platform 146 upon which the removed components are to be deposited. The top plate 145 is provided with a plurality of perforations 147, having the configuration of the key pattern, in each of which there is an upstanding pin 148, which together form boundaries to support the respective components in stacked relation. The plate 145 is seated upon a plurality of angle irons 149 fixed to the truck body and is arranged to be removed with the transfer plate 146, when the latter is filled with the stacks of components. Likewise, the transfer platform 146 is provided with the same number and arrangement of perforations 150 through which the pins project to form the aforesaid outline boundaries for the removed components, such boundaries conforming to the particular key pattern. Thus, with the table 145 in place with the key pattern generally outlined by the pins 148 and the transfer platform 146 seated thereon with the pins projecting vertically, all spaces between the pins will be in position to receive the components when released by the superposed suction nozzles 95.

In order that the platform 146 can be lowered step by step as each plane of components is released, it is mounted upon the top of two oppositely disposed channel bars 151 vertically slidable respectively along the outside of two sides of the truck body, such bars 151 being seated respectively upon the upwardly turned ends 152 of two transversely arranged lift beams 153, each of which projects through vertical slots 154 in the truck sides to ride in guide angles 155 fixed to the aforesaid truck sides. Each lift beam 153 is carried by two spaced apart links 156 respectively forming a pivotal connection to the upper end of two double link toggles 157, the lower ends of each of which are pivoted at 158 to the truck base 160. The intermediate pivotal points of the toggle respectively mount rollers 161 and 162.

For operating the two sets of toggles 157, a right-hand and left-hand threaded feed screw 163 is rotatably mounted between the two toggles in parallel relation thereto, and has two leader nuts, in the form of follower bars 164 and 165 each of a length to engage one roller of each set of toggles. Thus, the bar 164 will ride against the outer face of the roller 161 of each of the toggles, while the bar 165 will ride against the outer face of the roller 162 of each of the toggles. The bar 164 is threaded upon right-hand thread of the feed screw 163, while the bar 165 is threaded upon the left-hand thread of the feed screw 163. With this arrangement, the turning of the screw 163 in one direction will feed the follower bars 164 and 165 together to contract the toggle and elevate the lift bars 153, and when turned in the other direction will separate the bars 164 and 165 to allow the toggle to expand and thus lower the lift bars 153. Since at this stage in the cycle of operations the trucks are being loaded, the toggle will be in contracted position to locate the transfer platform 146 relatively close to the plane of the nozzles 95 when ready to discharge and the screw feeding mechanism is geared to lower the platform step by step by a step distance equal to the thickness of component material. As shown, this action is carried out by keying a ratchet wheel 166 to the feed screw 163 in position to be engaged by a spring pressed pawl 167, pivotally carried by an arm 168 swingingly mounted on the unthreaded portion of the screw 163. The arm 168 carries a cam roller 170 biased by a coil spring 171 against the face of a cam 172 keyed to a driven shaft 173. The spring 171 is coiled about a bolt 174 having a nut 175 bearing against a fixed lug 176 which forms an abutment for one end of the said spring. The opposite end of the bolt 174 is connected to the arm 168 and thus gives an adjustment to vary the stroke of the pawl for step operation conforming to material thickness.

In order to reset the lift and lowering step-by-step mechanism to receive a new load of components, the feed screw 163 projects at one side of the machine to mount a hand wheel 177 which, with the pawl 167 released, can be turned to restore the lift bars 153 to the required position to locate the empty platform 146 correctly in component-receiving position.

As a means for locking each truck in its proper location with respect to the overhead box units, opposite frame uprights 178 are respectively provided with inwardly fixed tubular keepers 180 respectively alined with horizontally movable bolts 181 which are operated by a rack and pinion 182 on the truck body by a shaft 183 extending exterior of the truck body to be operated by a hand wheel.

The foregoing description, while specific to the truck 92, is equally applicable to the truck 93, since the construction of both is identical, and therefore to avoid needless repetition like parts in the two trucks are identified by like reference numerals. It should be noted, however, that the ratchet mechanism of the two trucks is operated from a common source; thus, the two alined shafts 173 have their opposed ends provided respectively with gears 184 meshing respectively with gears 185 on a common shaft 186 which is driven through a reduction gear unit 187 in turn receiving power by way of a chain and sprocket drive 188 from the main drive shaft 68.

After leaving stage D, the web, with its key pattern and voids left by the removed components, is fed to stage E where the action of the suction box units takes places in reverse order, namely, pattern components complemental in shape to the voids are picked up alternately from stacks located at opposite sides of the machine upon trucks like those heretofore described. Thus, while a suction unit is depositing components from a stack into the voids, the other suction unit is picking up the top layer of several stacks from a truck platform and the operation continues alternately but in reverse to the suction units at stage D. It will be understood that the web moves step by step through the several stages and therefore when one pattern length is below a suction unit at stage D, another pattern length will be below a suction unit at stage E, but the D suction unit will be picking up components to be removed while the suction unit at stage E will be placing selected pattern components in the voids left by the components removed at stage D. The entire suction assembly at stage E and its operating mechanism are identical with that at stage D and can be followed from the description of and showing of Fig. 12 of the drawings, but for a clear understanding, those parts of stage E which are visible in Fig. 8-A and Fig. 11 and correspond to like parts in stage D are identified as follows: the skeleton upright side frames 191, side channel bars 192, suspended by lift rods 193, bell cranks 194, bell crank operating cams 195, counterweights 196, suction box units 197 and 199, including the described suction nozzles and vacuum-creating chest and control valve communicating with suction pipe 198 leading to the evacuating chamber 200. The transverse shifting mechanism for bringing the two suction box units alternately over the key pattern and side trucks is the same as described for stage D, but with pick-up and discharge reversed as to the like actions at stage D. This action is made possible by mounting the box shifting units cam 201 one hundred and eighty degrees out of phase with the cam 143 of stage D. The cam 201 is keyed to a shaft 202 extending horizontally towards and in the plane of the shaft 139 so that the free ends of each are spaced apart both axially and laterally. A common means is provided for operating the aforesaid two shafts, comprising a reduction gear 203 driving at opposite ends respectively two pinions 204 and 205, the former 204 meshing with a larger gear 206 keyed to the shaft 202, and the latter 205 meshing with a larger gear 207 keyed to the shaft 139. Thus, as shown in Fig. 8–A the gear 206 will be behind the pinion 204 and the gear 207 in front of the gear 205 in order to actuate the respective cams 143 and 201. By this construction, two suction units, one at each stage D and E are over the web, the one at stage D will be removing components, while the one at stage E will be discharging components. Likewise the other two suction units, one at each stage D and E, will be over trucks respectively, the stage D unit discharging removed components, and the stage E unit picking up components for transfer to the key pattern. In connection with the mounting and operation of the two shafts 139 and 202, it should be noted that the former is journalled in a bearing 208 and mounts a counterweight 210, while the latter is journalled in a bearing 211 and mounts a mounterweight 212. These counterweights 210 and 212 plus the balanced relation of the two cams 143 and 201 promote smooth operation without sudden shocks normally incident to reverse motions.

Continuous motion is transmitted to the reduction gear 203 by a bevel gear drive from a vertically disposed shaft 213 driven through a reduction gear unit 214 actuated by a chain and sprocket drive 215 from the main shaft 68. This shaft 68 extends medially throughout the length of the machine and supplies power to other parts as will be described. Furthermore, the drive of the shaft 139 is transferred by a chain and sprocket drive 217 to a transverse shaft 218 to bevel gears 220 and 221 to actuate the cam shafts 79 and 179 upon which the respective rows of cams 86 and 195 are mounted. Motion is transmitted to the cam shaft 79' from the shaft 79 by a sprocket and chain drive 90. The outer row of cams 195 at stage E is carried by shaft 195' driven by sprocket and chain 196' from the shaft 179.

For reinforcing the upright frames for the respective mechanisms of stages D and E, cross trusses 222 and 223 are provided.

When the web leaves stage E, the key pattern has been filled in with the mechanically placed component and the final inlay pattern has been completed. It now remains for these placed components to be pressed into the linoleum mix and this takes place at stage F, where the completed web pattern is brought under a heated platen press 224 reciprocated in proper timed relation with the step-by-step travel of the web. This pattern press 224 is generally like the press of stage B and may be operated by a like cam reciprocating means receiving motion from the main shaft 68.

For imparting the desired step-by-step motion to the conveyors 12, each is in the form of an endless steel band extending along one side of the machine and travelling around idle roller 225 at one end of the machine and around a driven wheel 226 at the other end of the machine. The periphery of each wheel 226 is provided with suitably spaced notches 227 with which lugs 228, fixed to the underside of each conveyor band, are arranged to mesh and thereby propel the band as the wheel turns in a succession of angular steps. As shown, the lugs 228 are so linearly spaced equally apart that each angular turning of the wheels 226 advances the conveyors a distance of eighteen linear inches. The wheels 226 are keyed to a shaft 230 suitably journalled transversely of the main frame of the machine and are arranged to be turned step by step by a ratchet wheel 232 located between the wheels 226 and keyed to the shaft 230 and for actuation by a spring pressed pawl 233. This pawl 233 is carried by an arm 234 mounted on the shaft 230 as a pivot, one portion of said arm being in the form of a rack gear 235 in mesh with an arcuate rack 236 on the outer face of a rock arm 237 pivoted on a spindle 238 supported from the machine frame. Journalled on one side of the rock arm 237 is a cam roller 240 riding upon the face of a cam 241 journalled on a counter shaft 242 and driven through a suitable reduction gearing from the main shaft 68.

In order to lock the step-by-step wheels 226 in each rest position, a hub 239 is keyed to the shaft 230 and carries a plurality of radially arranged keepers 243 respectively having V-shaped slots 244 for successive engagement by a bolt 245 having a V-shaped end to enter a slot 244. The position of the bolt 245 and the spacing of the keepers 243 is such that in each rest position of the conveyors the bolt 245 can enter one of the keepers 243 to prevent movement of the wheels 226 while stage operations are taking place. The bolt 245 is carried by its rock arm 246 which is pivoted on the spindle 238 and receives its locking and unlocking motion by means of a driven cam 247, which rides under a cam roller 248 journalled to the side of the rock arm 246. The cam 247 is keyed to the same shaft 242 as the cam 241, and both cams are operated by the rotation of the shaft 242 which is driven through suitable reduction gears 250 and 251 from the main shaft 68.

The main shaft 68 runs substantially medially throughout the length of the machine and is arranged to be driven continuously by a motor 252 and pulley belt drive 253 located at a convenient location.

It will now be apparent that a complete unitary machine for making inlaid linoleum has been devised whereby the production of such linoleum has been materially increased; the cost of manufacture reduced; the time of changing from one pattern to another being revolutionarily shortened; and the number of operatives required being reduced to a minimum unknown in prior linoleum-making machines. In such prior machines the changing of patterns requires days to accomplish during which all production on the machine ceases, while in the machine of the present invention such change of pattern can be made in a matter of minutes because it requires only the substitution of one key pattern die for another. Furthermore, when such a change is contemplated, carrying trucks can be prepared with the new pattern components while the machine is still running off the last of the pattern to be discarded. Also, in prior machines the maximum rate of production is eight feet per minute, while by the machine of this invention the rate of production can be stepped up to thirty feet per minute.

Having thus described my invention, I claim:

1. In a machine for making inlaid linoleum, the combination of a backing web, means for applying an adhesive to said web in the form of a predetermined key pattern, means to superpose a linoleum mix on said web and key pattern, means for severing said mix along lines bounding said key pattern while pressing said mix to adhere to said key pattern, and means to remove the severed portions of said mix from said backing.

2. A machine in accordance with claim 1 wherein means are provided to replace said removed portions with selected linoleum components to form a predetermined inlay pattern.

3. In a machine for making inlaid linoleum, the combination of a backing web provided with a linoleum mix face thereon, means for cutting said linoleum mix in a predetermined key pattern of selected width, and means for removing the mix portions bounded by said key pattern.

4. A machine in accordance with claim 3 wherein means are provided to replace said removed portions with selected linoleum components to form a predetermined inlay pattern.

5. In a machine for making inlaid linoleum, the combination of a backing web, a sheet of linoleum mix loosely seated upon said web, means including a pressing platen for causing said mix to become attached to said backing in the shape of a predetermined key pattern, means for severing the remaining portions of said mix from said key pattern as boundaries thereof, and means to remove said severed portions of said mix from said backing web.

6. In a machine for making inlaid linoleum, the combination of a backing web provided with a linoleum mix face thereon, means for cutting said mix in a predetermined key pattern of selected width to bound areas to be removed, a platform supported beside the machine having a plurality of upstanding pins arranged to form receiving spaces complemental to the contour of the respective said areas, and means for removing the said areas outlined by said key pattern and discharging said areas respectively into the corresponding spaces defined by said pins.

7. A machine in accordance with claim 6 wherein means are provided for lowering said platform step by step as successive areas are added to form a stack confined by said pins.

8. In a machine for making inlaid linoleum, the combination of means for feeding step by step a backing web having a linoleum mix on the face thereof, means operative in a rest position of said web for severing predetermined areas of said mix to separate areas of a key pattern from the remaining areas, means operative in a second rest position of said web for removing said remaining areas, and means operative during another rest position of said web for stacking said removed areas at one side of the machine.

9. In a machine for making inlaid linoleum, the combination of means for feeding step by step a backing web having a linoleum mix on the face thereof, means operative in a rest position of said web for severing predetermined areas of said mix to separate areas of a key pattern from the remaining areas, means operative in a second rest position of said web for removing said remaining areas, means operative during another rest position of said web for stacking said removed areas at one side of the machine, a stack of pattern components supported adjacent the next successive rest position of said web, said components being respectively of the same size and contour as the said removed areas, and means for inserting said components in the corresponding spaces respectively left in the mix by the removed areas.

10. In a machine for making inlaid linoleum, the combination of a backing web, means for feeding said web step by step, a platen having a cameo face in the form of a selected key pattern, means for coating said cameo key pattern with an adhesive, means for pressing said cameo coated face on said web during a rest position of said web to transfer said key pattern adhesive to said web, means to superpose a linoleum mix to cover both said key pattern and areas bounded by said pattern, a pressing head having cutting blades arranged to register with said key pattern, means operative in another rest position of said web for causing said head to press said mix against key pattern adhesive and to sever said mix into areas bounded by said key pattern, and means to remove said areas to leave spaces outlined by said key pattern.

11. A machine in accordance with claim 10, wherein means are provided for automatically placing components respectively of like size and shape to said removed areas in said spaces respectively to form a predetermined inlay pattern.

12. In a machine for making inlaid linoleum, the combination of a backing web, means for feeding said web step by step, a platen having a cameo face in the form of a selected key pattern, means for coating said cameo key pattern with an adhesive, means for pressing said cameo coated face on said web during a rest position of said web to transfer said key pattern adhesive to said web, means to superpose a linoleum mix to cover both said key pattern and areas bounded by said pattern, a pressing head having cutting blades arranged to register with said key pattern, means operative in another rest position of said web for causing said head to press said mix against key pattern adhesive and to sever said mix into areas bounded by said key pattern, and means including a plurality of suction heads for removing the respective areas to leave spaces outlined by said key pattern.

13. A machine for making inlaid linoleum comprising the combination of a conveyor for feeding a continuous web of linoleum material, means for imparting a step-by-step motion to said conveyor, a unit for cutting a pattern of predetermined outline in said web while maintaining the integrity and continuity of the web, and means for operating said unit during a rest interval of said conveyor.

14. A machine for making inlaid linoleum comprising the combination of a conveyor for feeding a web of linoleum material, means for imparting a step-by-step motion to said conveyor, a unit for cutting a pattern of predetermined outline in said web to define certain areas for removal, means for operating said unit, a pick-up mechanism for removing said defined areas, and means for operating said mechanism during a rest interval of said conveyor.

15. A machine for making inlaid linoleum comprising the combination of a conveyor for feeding a web of linoleum material, means for imparting a step-by-step motion to said conveyor, a unit for cutting a pattern of predetermined outline in said web to define certain areas for removal, means for operating said unit during a rest interval of said conveyor, a pick-up mechanism for removing said defined areas, and means for operating said mechanism during another rest period of said conveyor.

16. A machine for making inlaid linoleum comprising the combination of a conveyor for feeding a web of linoleum material, means for imparting a step-by-step motion to said conveyor, a unit for cutting a pattern of predetermined outline in said web to define certain areas for removal, a pick-up mechanism for removing said defined areas to leave voids outlined by said pattern, a device for filling said voids respectively with linoleum components of like configuration, and means for operating said unit, said mechanism, and said device respectively during rest intervals of said conveyor.

17. A mechanism for making inlaid linoleum comprising the combination of a conveyor for feeding a web of linoleum material, said web having a key pattern cut therein to outline areas for removal, a pick-up mechanism for removing said areas and transferring said areas to a platform, and means for operating said pick-up mechanism during a rest interval of said conveyor.

18. A mechanism for making inlaid linoleum comprising the combination of a conveyor for feeding a web of linoleum material, said web having voids therein outlined by a key pattern, a replacing mechanism for transferring linoleum components complemental to said voids from a platform to respectively fill said voids, and means for operating said replacing mechanism during a rest interval of said conveyor.

19. A mechanism for making inlaid linoleum comprising the combination of a conveyor for feeding a web of linoleum material, said web having a key pattern cut therein to outline areas for removal, a pick-up mechanism for removing said areas and transferring said areas to a platform, a replacing mechanism for transferring linoleum components complemental to said areas from a platform to respectively replace said removed areas, and means for successively operating said pick-up and replacing mechanisms during rest periods of said conveyor.

20. In a machine for making inlaid linoleum, the combination of a backing web provided with a linoleum mix face thereon, means for setting said mix in a predetermined key pattern to bound areas to be removed and replaced, a platform supported beside the machine having a plurality of pins arranged to form receiving spaces for replacement elements complemental to the contour of the respective said areas, said pins disposed in conformance to the key pattern beside the receiving spaces whereby stacks of replacement elements in said receiving spaces are held in vertical alignment with maintenance of their respective planar dispositions without undesirable lateral compression by contact with said pins.

21. A method of forming inlaid linoleum which comprises associating a sheet of linoleum mix with a backing web, cutting selected portions from said sheet, while maintaining the unsevered integrity of the backing web and the continuous integrity of the said sheet, removing said portions to leave a key pattern of linoleum on said web, and replacing the removed portions with linoleum elements registering with the key pattern on said web.

22. A method of forming inlaid linoleum, which comprises applying a continuous layer of linoleum mix to a traveling continuous web of backing material, causing parts of the layer to adhere to the material in accordance with a key pattern, severing the layer along lines bounding the key pattern, removing the severed portions of the layer from the backing layer while maintaining the continuous integrity of the layer and backing material, and replacing the removed portions by selected linoleum components registering with the key pattern so as to form a homogeneous inlaid surface.

THOMAS PESCI.

REFERENCES CITED

The following references are of record in the file of this patent:

UNITED STATES PATENTS

| Number | Name | Date |
| --- | --- | --- |
| 1,014,397 | Jones | Jan. 9, 1912 |
| 2,287,573 | Schneider | June 23, 1942 |

FOREIGN PATENTS

| Number | Country | Date |
| --- | --- | --- |
| 510,565 | Great Britain | Aug. 3, 1939 |